US010255633B2

(12) United States Patent
Hammock et al.

(10) Patent No.: US 10,255,633 B2
(45) Date of Patent: Apr. 9, 2019

(54) SYSTEMS AND METHODS FOR PROVIDING SELLER-INITIATED FINANCING IN PRIVATE SALES

(71) Applicant: Capital One Services, LLC, McLean, VA (US)

(72) Inventors: Luke A. Hammock, Washington, DC (US); Janusz Michael Niczyporuk, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/901,607

(22) Filed: Feb. 21, 2018

(65) Prior Publication Data

US 2018/0182032 A1 Jun. 28, 2018

Related U.S. Application Data

(63) Continuation of application No. 14/042,333, filed on Sep. 30, 2013, now Pat. No. 10,134,088.

(60) Provisional application No. 61/727,522, filed on Nov. 16, 2012.

(51) Int. Cl.
*G06Q 40/02* (2012.01)
(52) U.S. Cl.
CPC .................. *G06Q 40/025* (2013.01)
(58) Field of Classification Search
CPC .................................................. G06Q 40/025
USPC ......................................................... 705/38
See application file for complete search history.

(56) References Cited

U.S. PATENT DOCUMENTS

| | | | |
|---|---|---|---|
| 2001/0047307 A1* | 11/2001 | Bennett | G06Q 30/0207 705/26.41 |
| 2002/0169640 A1 | 11/2002 | Freeland | |
| 2009/0228369 A1 | 9/2009 | Bennett et al. | |
| 2010/0106639 A1* | 4/2010 | Banerjee | G06Q 30/00 705/38 |
| 2011/0231285 A1* | 9/2011 | Englund | G06Q 30/0603 705/26.41 |
| 2012/0072992 A1* | 3/2012 | Arasaratnam | G06F 21/602 726/26 |

* cited by examiner

*Primary Examiner* — Jessica Lemieux
(74) *Attorney, Agent, or Firm* — Finnegan, Henderson, Farabow, Garrett & Dunner LLP

(57) ABSTRACT

Methods and systems are disclosed for providing seller-initiated financing in a sale of an item between private parties. A financial service system configures a financing program to give sellers the opportunity to offer prospective buyers financing directly. The financial service system enrolls a given seller in the program, providing resources and services to the seller to help market the sale and select a credit-worthy buyer. Once the transaction is completed, the financial service system transfers proceeds to the seller, then configures a loan account and payment plan for the buyer. Alternatively, the program can be implemented with an intermediate service provider, such as an online marketplace retailer. The service provider enrolls the seller and assists with marketing and buyer selection, and the financial service system transfers proceeds to the seller and service provider, and configures a loan account and payment plan for the buyer.

20 Claims, 8 Drawing Sheets

SYSTEMS AND METHODS FOR PROVIDING SELLER-INITIATED FINANCING IN PRIVATE SALES

CROSS REFERENCE TO RELATED APPLICATION

This application is a continuation of U.S. application Ser. No. 14/042,333, filed Sep. 20, 2013, which claims priority under 35 U.S.C. § 119 to U.S. Provisional Application No. 61/727,522, filed on Nov. 16, 2012. The aforementioned applications are incorporated herein by reference in the present application.

FIELD

The disclosed embodiments generally relate to financing sales between private parties and, in particular, providing independent sellers of items the ability to provide financing options directly to prospective buyers of their items.

BACKGROUND

Advances in the financial and information technology industries have transformed the way items, such as automobiles, are bought and sold. Automobiles, for example, were once almost exclusively purchased after a prospective buyer ventured onto the lot of the local car dealership. Today, many of these transactions occur between a private seller and a private buyer via the Internet, without the involvement of a dealer at all.

A private transaction has advantages—namely price, lack of hassle, and more natural comfort in the negotiation process, but disadvantages as well. Few buyers can afford to pay cash up front for an expensive purchase such as an automobile, and buyers may struggle to get loan financing from a financial service account provider for a purchase from an independent seller. Additionally, individual sellers of cars are wary of accepting cash from buyers (for example, due to risk of fraud) and are unable to share in the financial benefits of facilitating lending in the way dealers currently do (i.e. dealers currently get a cut of loan profits, individual sellers do not).

Accordingly, a need exists in the current marketplace to provide independent sellers of items the capability to provide financing options directly to prospective buyers of their items.

SUMMARY

Methods and systems consistent with the present disclosure enable a computing system to receive an indication that a seller seeks to provide financing options to prospective buyers of an item via a seller listing, and provide resources to the seller operable to allow the seller to offer the financing options to the prospective buyers via the seller listing. The computing system may receive information relating to creditworthiness from a plurality of prospective buyers via the seller listing, and may provide at least a subset of the received information to the seller. Additionally, the computing system may receive a notification of the seller's selection of a buyer from the plurality of buyers, and may configure a loan account for the buyer provided by the financial service system. The computing system may also receive purchase transaction information associated with the sale of an item associated with the seller listing. Further, the computing system may receive an indication that the title to the item has transferred from the seller to a financial service system, and may provide funds associated with the sale to the seller.

In another embodiment, a method is disclosed for providing financing for a sale conducted between private parties. The method includes receiving an indication that a seller seeks to provide financing options to prospective buyers of an item via a seller listing, and providing resources to the seller operable to allow the seller to offer the financing options to the prospective buyers via the seller listing. The method includes receiving information relating to creditworthiness from a plurality of prospective buyers via the seller listing, and providing at least a subset of the received information to the seller. Additionally, the method includes receiving a notification of the seller's selection of a buyer from the plurality of buyers, and configuring, by one or more processors, a loan account for the buyer provided by the financial service system. The method also includes receiving purchase transaction information associated with the sale of an item associated with the seller listing. Further, the method includes receiving an indication that the title to the item has transferred from the seller to a financial service system. Finally, the method includes providing funds associated with the sale to the seller.

In yet another embodiment, a system is disclosed for providing financing for a sale conducted between private parties. The system may be configured to receive an indication that a seller seeks to provide financing options to prospective buyers of an item via a seller listing, and provide resources to the seller operable to allow the seller to offer the financing options to the prospective buyers via the seller listing. The system may be configured to store the seller listing in an inventory database. Additionally, the system may be configured to transmit seller information to a financial service system, and may receive notification from the financial service system that the seller qualifies for a private financing program. Further, the system may be configured to modify the seller listing to reflect the availability of financing. The system may also be configured to receive notice from the seller of the identity of a selected buyer, and receive transaction information relating to a purchase transaction associated with the buyer and seller.

Additional objects and advantages of the disclosed embodiments will be set forth in part in the description which follows, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed. For example, the methods relating to the disclosed embodiments may be implemented in system environments outside of the exemplary system environments disclosed herein.

BRIEF DESCRIPTION OF THE DRAWINGS

The accompanying drawings, which are incorporated in and constitute a part of this specification, illustrate various embodiments and aspects of the disclosed embodiments and, together with the description, serve to explain the principles of the disclosed embodiments. In the drawings.

DETAILED DESCRIPTION

Reference will now be made in detail to disclosed embodiments, examples of which are illustrated in the accompanying drawings. Wherever convenient, the same reference numbers will be used throughout the drawings to refer to the same or like parts.

Generally, disclosed embodiments are directed to systems and methods for providing sellers of items the opportunity to offer prospective buyers financing in a private sale. For ease of discussion, embodiments may be described in connection with the sale of automobiles. It is to be understood, however, that disclosed embodiments are not limited to the sale of automobiles and may, in fact, be applied to the sale, auctioning, etc. of any item, product, or service. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. The processes disclosed herein may be implemented by a suitable combination of hardware, software, and/or firmware. For example, the disclosed embodiments may implement general purpose machines that may be configured to execute software programs that perform processes consistent with the disclosed embodiments. Alternatively, the disclosed embodiments may implement a specialized apparatus or system configured to execute software programs that perform processes consistent with the disclosed embodiments.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

Figure 1:
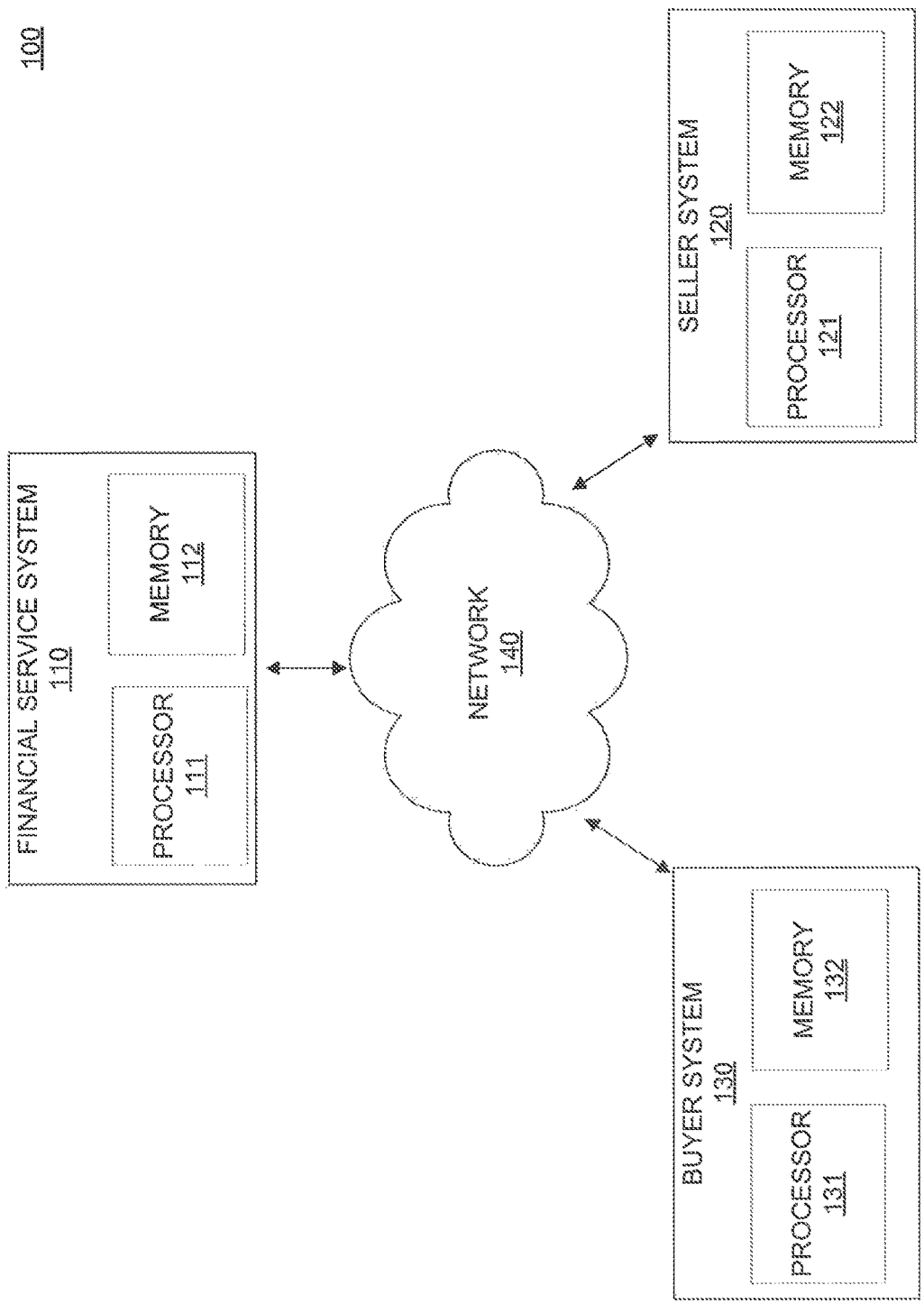
FIG. 1 illustrates an exemplary system consistent with disclosed embodiments.

FIG. 1 illustrates an exemplary system 100 consistent with disclosed embodiments. In one aspect, system environment 100 may include a financial service system 110, seller system 120, buyer system 130, and network 140.

Financial service system 110 may be one or more entities that configure, offer, provide, and/or manage financial service accounts, such as credit card accounts, debit card accounts, checking or savings accounts, and loan accounts. Consistent with the disclosure, financial service system 110 may provide a loan account for financing a purchase to one or more consumers, such as buyer system 130. In some embodiments, financial service system 110 may receive and process payments from consumers, such as buyer system 130, relating to provided financial service accounts. Financial service system 110 may also process other funds and payments related to a sale, such as transmitting funds comprising the sales price of the item or service to seller system 120.

Financial service system 110 may include one or more components that perform processes consistent with the disclosed embodiments. For example, financial service system 110 may include one or more computers (e.g., servers, database systems, etc.) configured to execute software instructions programmed to perform aspects of the disclosed embodiments, such as generating financial service accounts, maintaining accounts, processing information relating to accounts, etc. Consistent with disclosed embodiments, financial service system 110 may include other components and infrastructure that enable it to perform operations, processes, and services consistent with financial service account providers, such as banking operations, credit card operations, loan operations, etc. Consistent with disclosed embodiments, financial service system 110 may be configured to provide, manage, monitor, and assess a seller-initiated financing program for a sales transaction between two private parties.

Seller system 120 may represent an entity seeking to sell an item to another party. Although the following description of certain embodiments may refer to an "individual," one skilled in the art would appreciate that the same description applies to multiple sellers acting in concert or to a seller entity in the manner described above. Seller system 120 may include components and infrastructure that enable it to perform operations, processes, and services consistent with merchants, such as providing websites that offer for sale goods and/or services, processing sales transactions of purchases made over the Internet or at POS locations, and communicating with financial service system 110 or other components relating to the transactions. Consistent with disclosed embodiments, seller system 120 may be configured to provide financing to the buyer of an item and process the sales transaction.

Buyer system 130 may represent an entity seeking to buy an item from another party. Although the following description of disclosed embodiments may refer to an "individual," it is to be understood that the same description applies to multiple sellers acting in concert or to a seller entity in the manner described above. Buyer system 130 may include one or more components that perform processes consistent with the disclosed embodiments. For example, buyer system 130 may include one or more computers (e.g., servers, database systems, etc.) that are configured to execute software instructions programmed to perform aspects of the disclosed embodiments. One of ordinary skill in the art would recognize that buyer system 130 may include components and infrastructure that enable it to perform operations, processes, and services such as processing sales transactions of purchases made over the Internet or at POS locations, and communicating with financial service system 110 or other components relating to the transactions. Buyer system 130 may be configured to purchase an item, transmit and receive information associated with the purchase transaction, and process and monitor a loan account associated with financing the purchase transaction.

Consistent with disclosed embodiments, components of system 100, including financial service system 110, seller system 120, and buyer system 130, may include one or more processors (such as processors 111, 121, or 131) as shown in exemplary form in FIG. 1. The processors may be one or more known processing devices, such as a microprocessor from the Pentium™ family manufactured by Intel™ or the Turion™ family manufactured by AMD™. The processor may include a single core or multiple core processor system that provides the ability to perform parallel processes simultaneously. For example, the processors may be single core processors configured with virtual processing technologies known to those skilled in the art. In certain embodiments, the processors may use logical processors to simultaneously execute and control multiple processes. The processors may implement virtual machine technologies, or other similar known technologies to provide the ability to execute, control, run, manipulate, store, etc. multiple software processes, applications, programs, etc. In some embodiments, the processors may include a multiple-core processor arrangements (e.g., dual or quad core) configured to provide parallel processing functionalities to enable computer components of financial service system 110, seller system 120, and/or buyer system 130 to execute multiple processes simultaneously. Other types of processor arrangements could be implemented that provide for the capabilities disclosed herein. Moreover, the processors may represent one or more servers or other computing devices that are associated with financial service system 110, seller system 120, and/or buyer system 130. For instance, the processors may represent a distributed network of processors configured to operate together over a local or wide area network. Alternatively, the processors may be a processing device configured to execute software instructions that receive and send information, instructions, etc. to/from other processing devices associated with financial service provider 110 or other components of system environment 100. In certain aspects, processors 111, 121, and 131 may be configured to execute software instructions stored in memory to perform one or more processes consistent with disclosed embodiments.

Consistent with disclosed embodiments, components of system 100, including financial service system 110, seller system 120, and buyer system 130, may also include one or more memory devices (such as memories 112, 122, and 132) as shown in exemplary form in FIG. 1. The memory devices may store software instructions that are executed by processors 111, 121, and 131, such as one or more applications, network communication processes, operating system software, software instructions relating to the disclosed embodiments, and any other type of application or software known to be executable by processing devices. The memory devices may be a volatile or non-volatile, magnetic, semiconductor, tape, optical, removable, nonremovable, or other type of storage device or tangible computer-readable medium. The memory devices may be two or more memory devices distributed over a local or wide area network, or may be a single memory device. In certain embodiments, the memory devices may include database systems, such as database storage devices, one or more database processing devices configured to receive instructions to access, process, and send information stored in the storage devices.

In some embodiments, financial service system 110, seller system 120, and buyer system 130 may also include one or more additional components (not shown) that provide communications with other components of system environment 100, such as through network 140, or any other suitable communications infrastructure.

Network 140 may be any type of network that facilitates communications and data transfer between components of system environment 100, such as, for example, financial service system 110, seller system 120, and buyer system 130. Network 140 may be a Local Area Network (LAN), a Wide Area Network (WAN), such as the Internet, and may be a single network or a combination of networks. Further, network 140 may reflect a single type of network or a combination of different types of networks, such as the Internet and public exchange networks for wireline and/or wireless communications. Network 140 may utilize cloud computing technologies that are familiar in the marketplace. Moreover, any part of network 140 may be implemented through traditional infrastructures or channels of trade, to permit operations associated with financial accounts that are performed manually or in-person by the various entities illustrated in FIG. 1. Network 140 is not limited to the above examples and system 100 may implement any type of network that allows the entities (and others not shown) included in FIG. 1 to exchange data and information.

Although FIG. 1 describes a certain number of entities and processing/computing components within system environment 100, any number or combination of components may be implemented without departing from the scope of the disclosed embodiments. For example, different seller systems 120 may interact with one or more buyer systems 130 through network 140 or standard channels of trade, such as face-to-face purchase transactions. In another example, different financial service systems 110 may interact with one or more seller systems 120 and buyer systems 130 through network 140 or standard channels of trade. Additionally, financial service system 110, seller system 120, and buyer system 130 are not mutually exclusive. For example, in one disclosed embodiment, financial service system 110 and seller system 120 may be the same entity. The entities as described are not limited to their discrete descriptions above. Further, where different components of system environment 100 are combined (e.g., financial service system 110 and seller system 120, etc.), the computing and processing devices and software executed by these components may be integrated into a local or distributed system.

Figure 2:
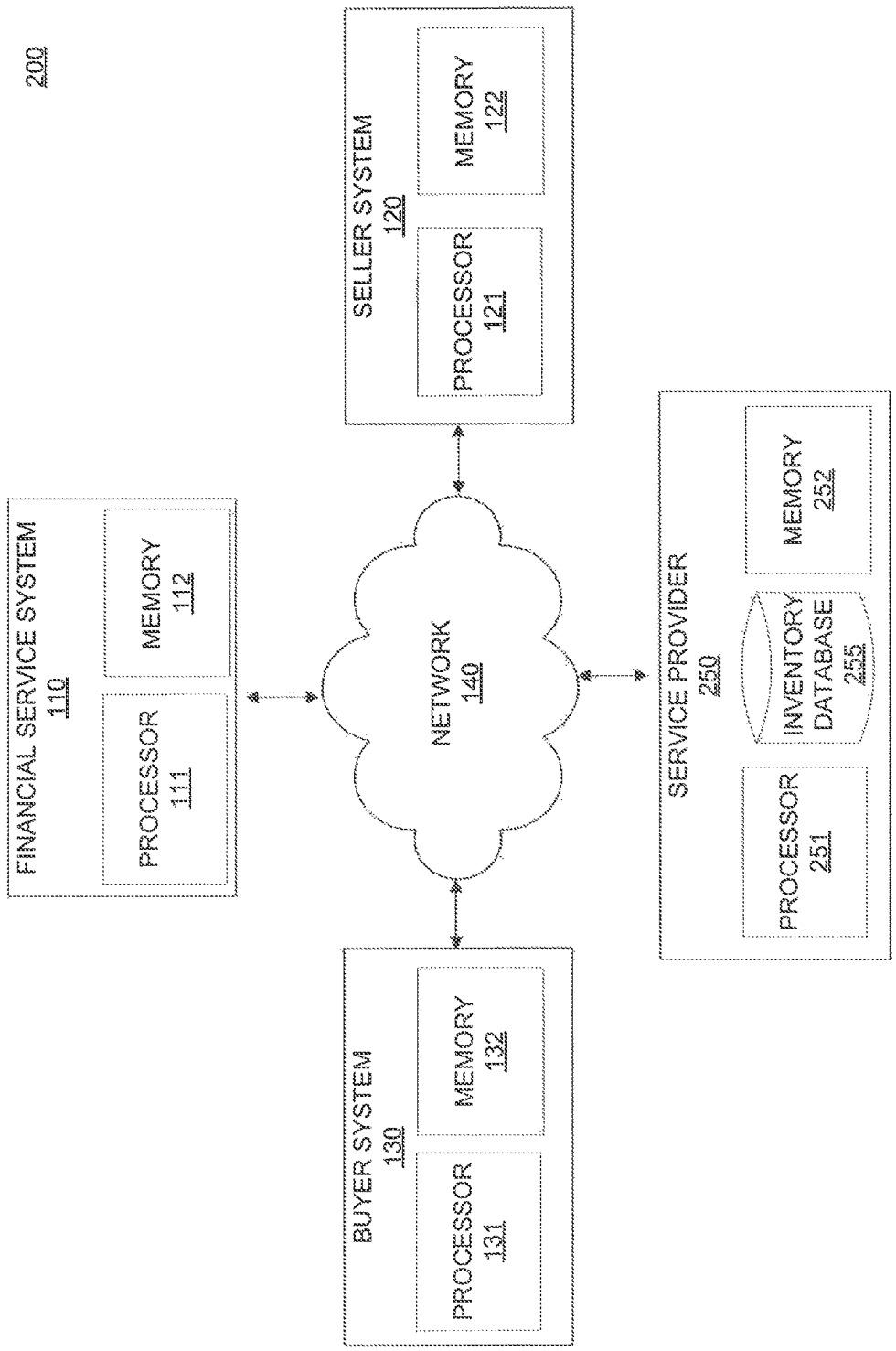
FIG. 2 illustrates an exemplary system consistent with disclosed embodiments.

FIG. 2 illustrates another exemplary system 200, consistent with disclosed embodiments. System 200 may include a financial service system 110, seller system 120, buyer system 130, network 140, and service provider 250. Financial service system 110, seller system 120, buyer system 130 and network 140 may be the same or similar to those described above for exemplary system environment 100.

Service provider 250 may represent one or more entities that may host, monitor, and process a purchase transaction between entities such as seller system 120 and buyer system 130. In one aspect, service provider 250 may be an independent entity from financial service system 110, or alternatively, financial service system 110 and service provider 250 may be associated with the same entity.

Service provider 250 may include one or more components with the same or similar hardware and/or software configurations and structures to those described above with respect to components of system 100. For example, a computer system of service provider 250 may include one or more processing devices, memory devices, interface devices, data, and executable software that allows service provider 250 to identify prospective customers, such as buyer system 130, prospective sellers, such as seller system 120, and prospective financial service account providers to provide financing for sales transactions, such as offered by financial service system 110. The computer system or computer device(s) may be configured to communicate funds back and forth between service provider 250 and other components of system environment 200, or may be configured as an intermediary that communicates data and funds between two or more components of system environment 200.

Inventory database 255 may represent one or more storage devices and/or systems that maintain data used by service provider 250. Inventory database 255 may include one or more processing components (e.g., storage controller, processor, etc.) that perform various data transfer and storage operations consistent with features consistent with the disclosed embodiments. In some aspects, inventory database 255 may be associated with an independent entity that provides database services for one or more components of system environment 200, consistent with the disclosed embodiments, or for one or more similar service providers 250 in other system environments outside of system environment 200. Inventory database 255 may be an internal component to service provider 250, as depicted in FIG. 2, or it may be an external device accessible by service provider 250.

In one embodiment, inventory database 255 may store items listed for sale from entities such as seller system 120. These listings may contain information about the items for sale, the seller systems 120, and financing information provided by seller system 120 and/or financial service system 110. These and other components of system environment 200, including buyer system 130, may be configured to interface with inventory database 255 via network 140 or other communication mechanisms.

In some embodiments, service provider 250 may include one or more processing components that enable and process communications with components of system environment 100 through network 140 or any other suitable communications infrastructure.

Figure 3:
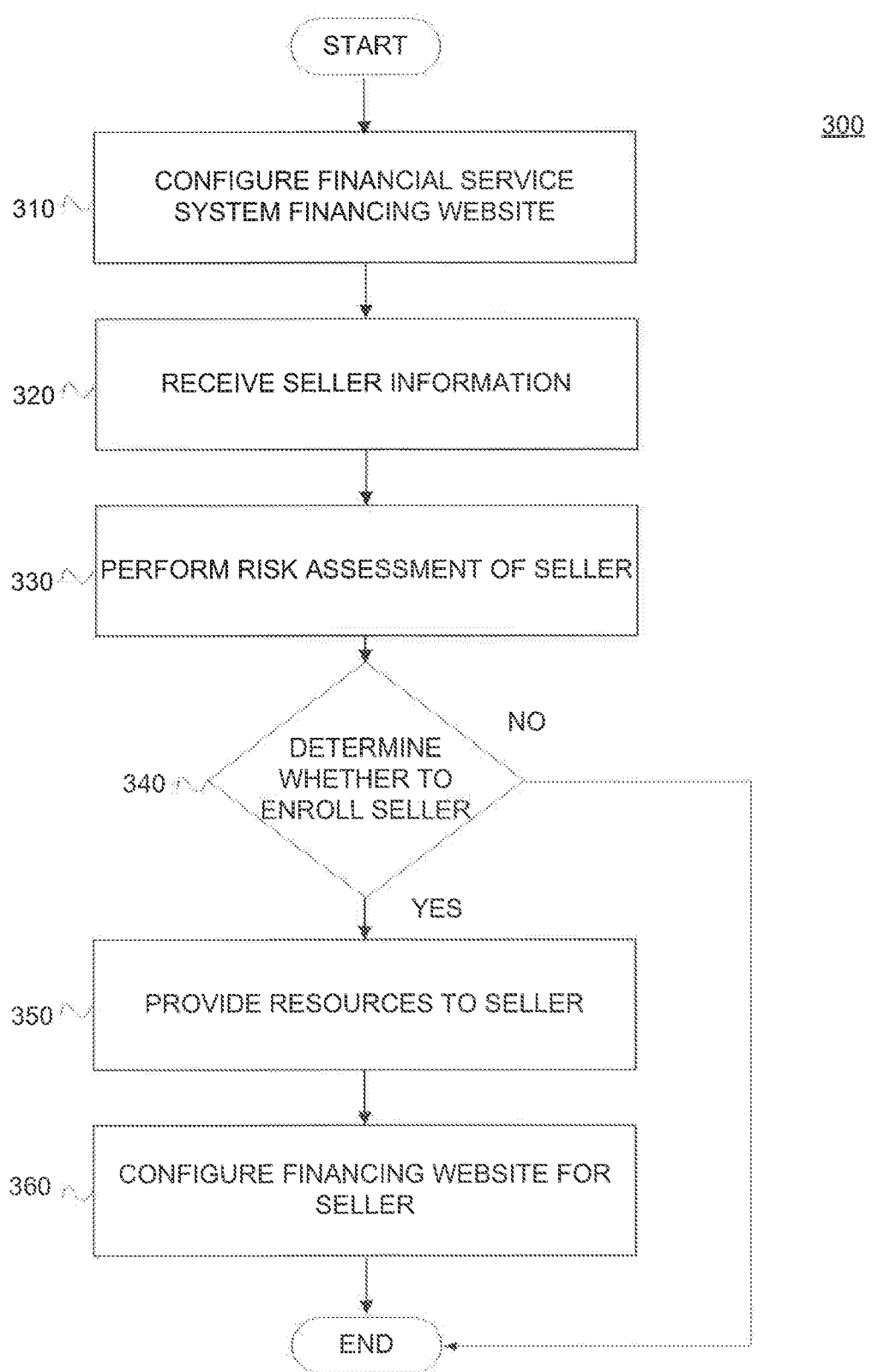
FIG. 3 is a flowchart of an exemplary seller enrollment process consistent with disclosed embodiments.

FIG. 3 illustrates an exemplary seller enrollment process consistent with disclosed embodiments. Financial service system 110 may configure a financing portal (Step 310), which may be a website accessible to the public. In other embodiments, the financing portal may include a unit within a brick and mortar banking location. Financial service system 110 may make prospective seller systems 120 aware of the financing portal via advertising, telephonic, postal, or electronic communication means, or by any other suitable means of communication.

Financial service system 110 may receive information about the user or users associated with seller system 120 via the financing portal (Step 320). The information gathered may include, for example, name, address, social security or other government ID number, credit history, employment information, financial history, information about the item proposed to be sold, and financial service account information. Additionally, the information may include availability for testing of the item, preferred maintenance contractors, a copy of the title to the item, etc. Financial service system 110, however, may prompt for more or less information.

Financial service system 110 may generate or receive a risk assessment, or other similar creditworthiness analysis, associated with the user or users of seller system 120 using the information received from seller system 120 (Step 330).

Financial service system 110 may use the information received from seller system 120, the results of the risk assessment of Step 330, and other predefined criteria to determine whether or not to accept the prospective seller into the seller-based financing program (Step 340). Financial service system 110 may determine not to accept the prospective seller into the program (Step 340; NO) based on the received information, and if so, the seller may proceed to sell the item to a buyer through conventional means.

Financial service system 110 may determine to accept the prospective seller into the financing program (Step 340; YES). Financial service system 110 may notify seller system 120 of the acceptance through telephonic, postal, or electronic communication means, or by any suitable well-known means of communication. Financial service system 110 may provide resources to seller system 120 to assist with the sale of the item and communication of the private financing opportunity to prospective buyers (Step 350). The resources provided to seller system 120 may include marketing materials, website or internet portal templates associated with a seller's goods or services, a dedicated web link to financing options, tailored emails, or tailored model listings designed for sites such as eBay®, Craigslist®, Cars.com®, or Edmunds®, etc. The resources provided to seller system 120 may include a widget, frame, or other software-based interface. The resources provided to seller system 120 may be configured to work with a mobile application on a mobile device. The resources provided by to seller system 120 may include, for example, means for a seller of goods or services to directly offer financing options to potential buyers of the goods or services. It is understood that the aforementioned resources are not limiting.

Financial service system 110 may configure a financing portal specifically for seller system 120 (Step 360). In some aspects, the portal may be a website. The portal may contain and/or link to specific information about seller system 120's sales listing(s). The portal may provide prospective buyers, including buyer system 130, an interface to seek and submit additional information associated with financing the purchase of seller system 120's item(s).

Figure 4:
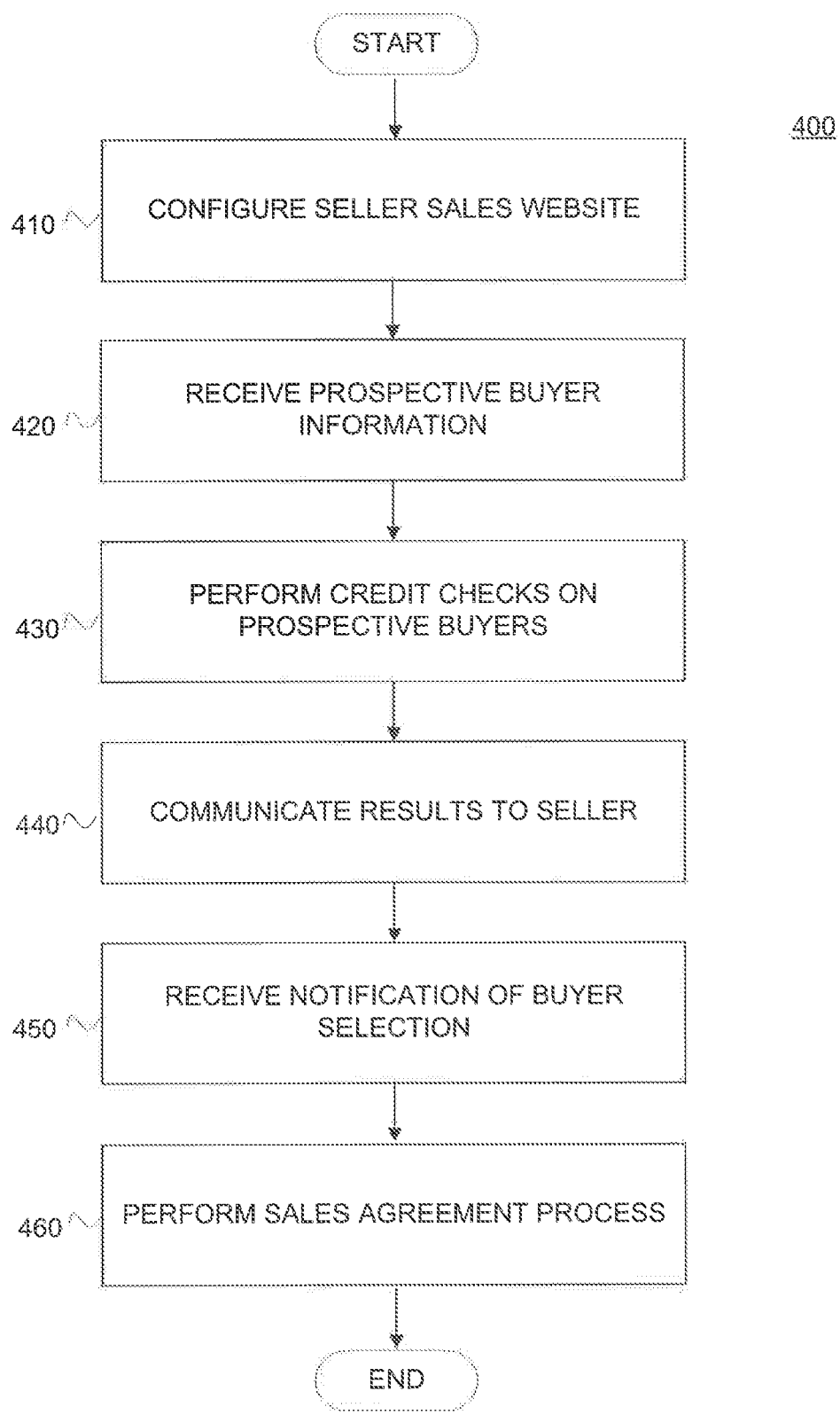
FIG. 4 is a flowchart of an exemplary buyer selection process consistent with disclosed embodiments.

FIG. 4 illustrates an exemplary process for screening and selecting prospective buyers of an item for financing, consistent with disclosed embodiments. Prospective buyer screening process 400, as well as any or all of the individual steps therein, may be performed by any one or more of financial service system 110 or seller system 120. For exemplary purposes, FIG. 4 is disclosed as being performed by financial service system 110.

Financial service system 110 may configure a portal or an interface for presentation to prospective buyers that offers financing directly through seller system 120 and/or financial service system 110 (Step 410). This portal may be the portal created in Step 360. In other embodiments, a new portal may be created. Regardless, the portal may utilize some or all of the resources provided in Step 350. The portal or interface may be customized for various sales marketplaces and methods. The portal or interface may also provide information about seller system 120, financial service system 110, and/or the item listed for sale.

Financial service system 110 may receive information related to creditworthiness from various prospective buyers, including buyer system 130 (Step 420). The information gathered may include, for example, name, address, social security or other government ID number, credit history, employment information, financial history, information about the item proposed to be sold, and financial service account information. Additionally, the information may include availability for testing of the item, preferred maintenance contractors, or other information. Financial service system 110, however, may prompt for more or less information.

Financial service system 110 may perform or receive information regarding creditworthiness checks on the various prospective buyers, including buyer system 130 (Step 430). For example, financial service system 110 may perform the creditworthiness checks within its own system, or financial service system 110 may transmit the information received from prospective buyers to other entities outside of system environment 100 to perform the creditworthiness checks via network 140.

Financial service system 110 may transmit some or all of the creditworthiness information regarding prospective buyers, including buyer system 130, to seller system 120 (Step 440). Prior to transmitting the information, financial service system 110 may shield or redact certain portions of the information that may be confidential. Prior to transmitting the information, financial service system 110 may perform various calculations relating to the information gathered in Steps 420 and 430. For example, financial service system 110 may offer seller system 120 a portion of the revenue derived from a prospective loan account configured for buyer system 130. In some embodiments, financial service system 110 may offer seller system 120 more or less revenue depending on the identity and creditworthiness of the user of buyer system 130. Financial service system 110 may present data to seller system 120 that reflects the creditworthiness of each buyer, including buyer system 130. Financial service system 110 may also provide the portion of the purchase price of the item that each prospective buyer, including buyer system 130, wishes to finance through seller system 120 and financial service system 110. Seller system 120 may select a preferred buyer from the various potential buyers based on the buyer data provided by financial service system 110.

Financial service system 110 may receive a notification from seller system 120 of the selection of a preferred buyer (Step 450). For exemplary purposes, this preferred buyer will be referred to as buyer system 130. Seller system 120 may select buyer system 130 based on the presentation of information and data in Step 440, and then transmit a notification that it selects buyer system 130. This notification may optionally be also transmitted to buyer system 130.

Financial service system 110 may also perform a sales agreement process after confirming the selection of buyer system 130 (Step 460), which will now be described in further detail.

Figure 5:
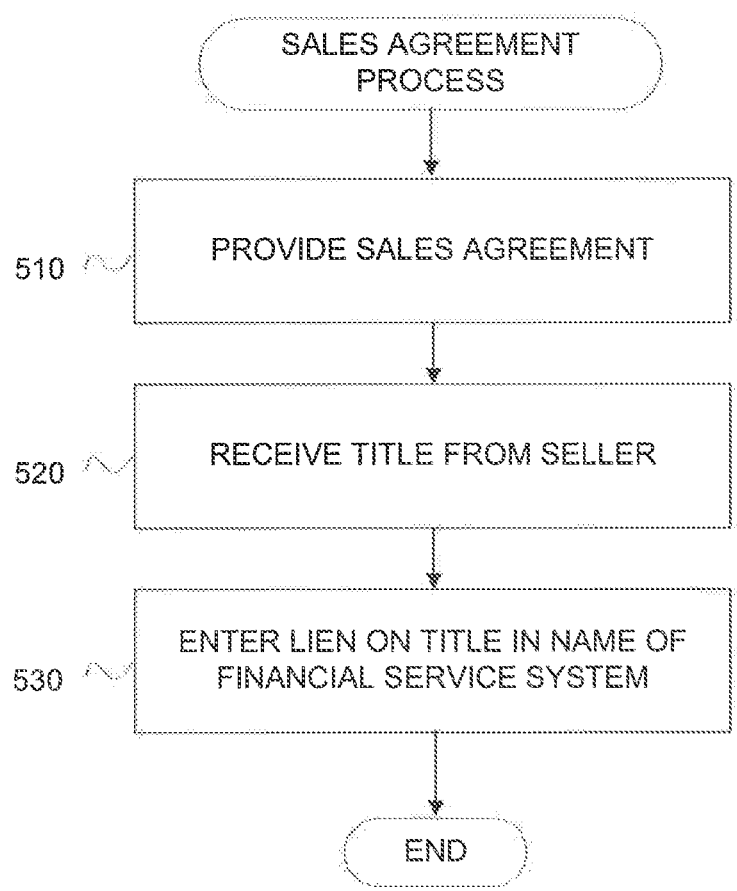
FIG. 5 is a flowchart of an exemplary sales agreement process consistent with disclosed embodiments.

FIG. 5 illustrates an exemplary sales agreement process, consistent with disclosed embodiments. Sales agreement process 500, as well as any or all of the individual steps therein, may be performed by one or more of financial service system 110, seller system 120, or buyer system 130. For exemplary purposes, FIG. 5 is disclosed as being performed by financial service system 110.

Financial service system 110 may provide a sales agreement to the relevant parties, including seller system 120 and buyer system 130 (Step 510). The sales agreement may be a standard contract based on the applicable laws of the jurisdiction or jurisdictions detailing the rights and obligations of financial service system 110, seller system 120, and buyer system 130. The sales agreement may document the steps of the purchase transaction, including logistics and timing for transfer of the item, transfer of funds, and registration of collateral for a loan account associated with the purchase transaction. Seller system 120 and/or buyer system 130 may provide an indication of agreement to the provided sales agreement. In other embodiments, the seller system 120 and/or buyer system 130 may indicate modifications to the provided sales agreement. Regardless, seller system 120, buyer system 130, and financial service system 110 may approve the agreement and store finalized forms in their respective memory devices.

Seller system 120 may receive and process the title to the item associated with the sales transaction from seller system 120 (Step 520). The title may be a physical document, in which case it may be received in physical form by postal mail or other personal delivery means. The title may also be an electronic document received directly by seller system 120.

Financial service system 110 may communicate with relevant governmental or regulatory agencies in the jurisdictions associated with the sales transaction for purposes of entering a lien on the title (Step 530). The lien may be contingent, for example, on routine payments to a loan account configured for buyer system 130. In some embodiments, financial service system 110 may register the title with relevant governmental or regulatory agencies in its own name. In another aspect, financial service system 110 may register the title with relevant governmental or regulatory agencies in the name of buyer system 130. Regardless, financial service system 110 may transmit information necessary for title registrations directly to the relevant governmental or regulatory agencies.

Figure 6:
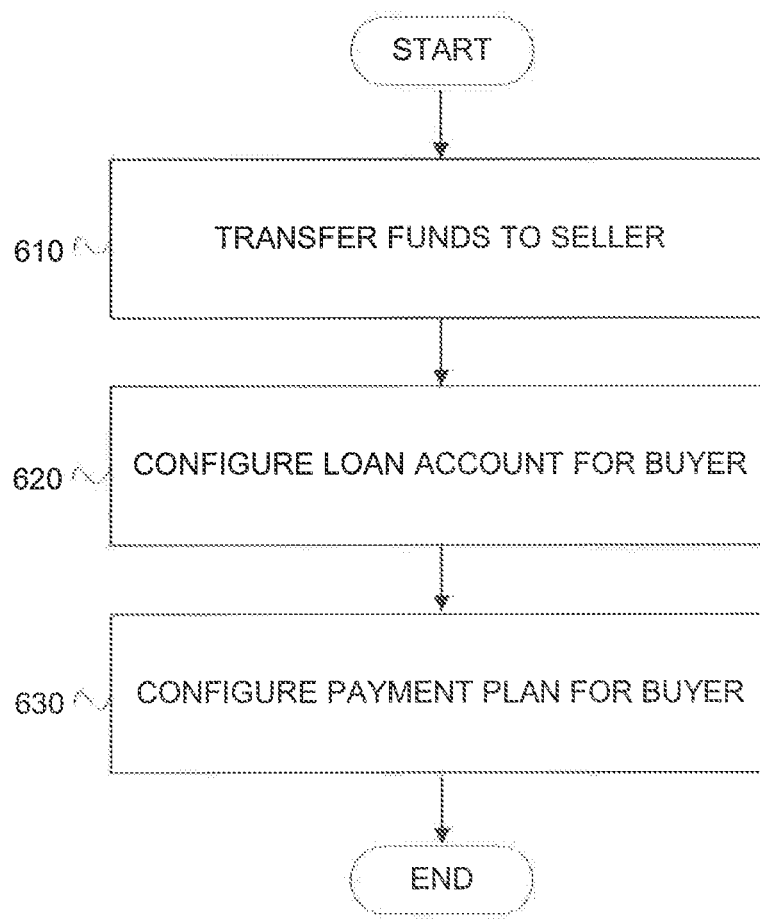
FIG. 6 is a flowchart of an exemplary funds transfer process consistent with disclosed embodiments.

FIG. 6 illustrates an exemplary funds transfer process consistent with certain disclosed embodiments. Funds transfer process 600, as well as any or all of the individual steps therein, may be performed by any one or more of financial service system 110 or seller system 120. For exemplary purposes, FIG. 6 is disclosed as being performed by financial service system 110.

Financial service system 110 may initiate the transfer funds associated with the sales transaction to seller system 120 (Step 610). The funds may comprise the financed portion of the sales price of the item purchased by buyer system 130. In another embodiment, the funds may comprise the financed portion of the sales price of the item purchased by buyer system 130 less fees charged by financial service system 110. In another embodiment, the funds may comprise the financed portion of the sales price of the item purchased by buyer system 130 plus revenue derived from a loan account configured for buyer system 130 associated with the transaction. In still another embodiment, the funds may comprise the financed portion of the sales price of the item purchased by buyer system 130 plus revenue derived from a loan account configured for buyer system 130 associated with the transaction less fees charged by financial service system 110.

Financial service system 110 may configure a loan account for buyer system 130 (Step 620). Financial service system 110 may determine various parameters for the loan account based on information observed by financial service system 110 and/or received from one or both of the seller system 120 and buyer system 130. The parameters may include, for example, the amount loaned, interest rate offered, duration of loan, and whether additional collateral other than the item associated with the purchase transaction may be required. It is understood that this list of parameters is not limiting and that any parameters relating to a loan account may be determined by financial service system 110.

Financial service system 110 may also configure a loan payment plan for buyer system 130 (Step 630). Similar to Step 620, financial service system 110 may determine various parameters for the loan payment plan including, for example, the amount of payment required in each installment, when installment payments will be due, where installment payments are to be sent, etc. It is understood that this list of parameters is not limiting and that any parameters well-known in the art describing and relating to a loan payment plan may be determined by financial service system 110.

Figure 7:
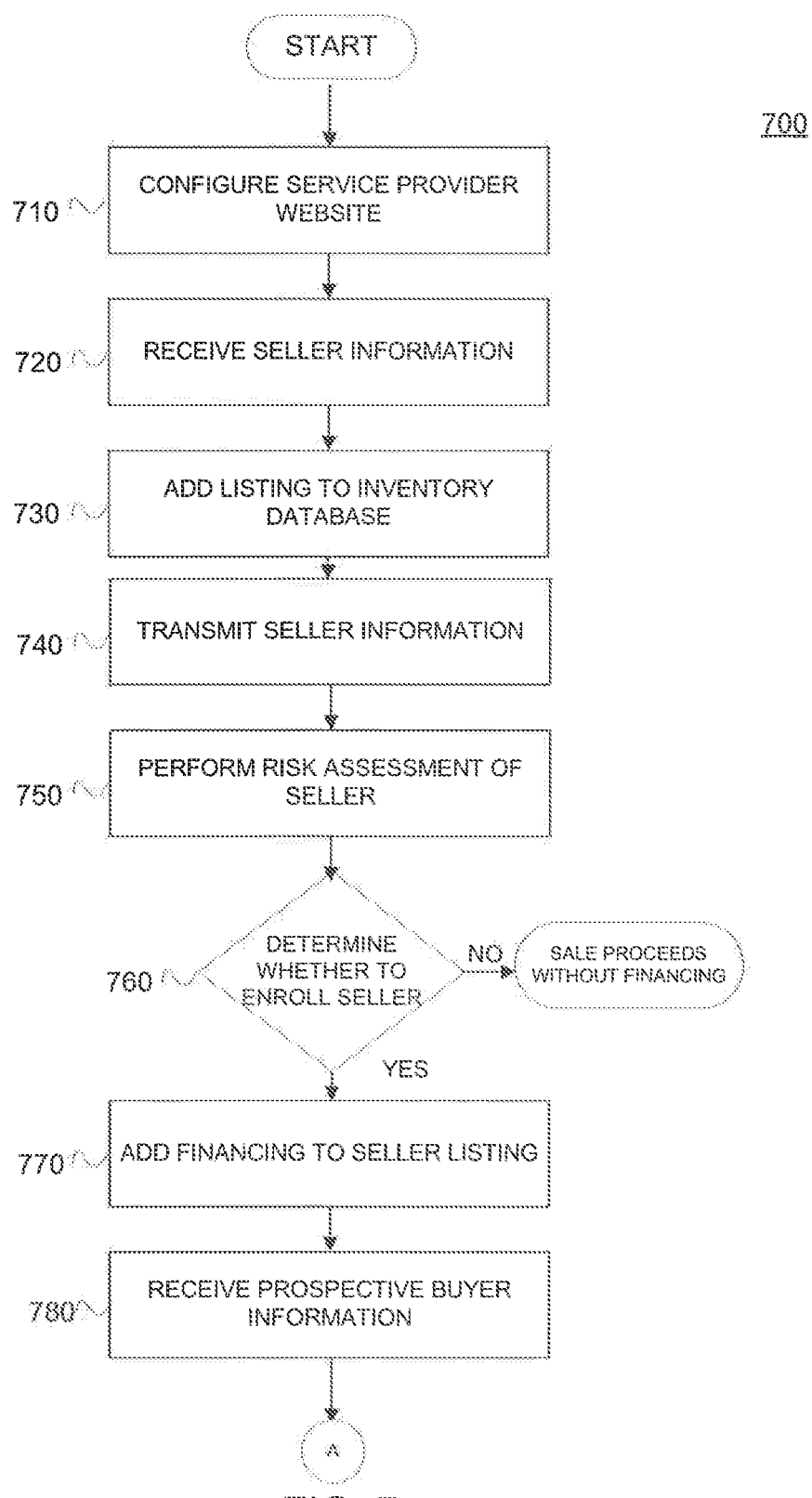
FIG. 7 is a flowchart of an exemplary seller-initiated financing process using an intermediary service provider consistent with disclosed embodiments.

FIG. 7 illustrates an exemplary seller-initiated financing process using an intermediary service provider consistent with disclosed embodiments. Seller-initiated financing process 700, as well as any or all of the individual steps therein, may be performed by any one or more of financial service system 110, seller system 120, buyer system 130, or service provider 250. For exemplary purposes, FIG. 7 is disclosed as being performed by service provider 250.

Service provider 250 may configure a service provider sales portal (Step 710). The portal may be, for example, an internet website accessible over network 140, and its executable code may be stored in memory 252. The portal may be configured for sales of various goods or services, or tailored towards sales of a specific good or service. In one aspect, service provider 250 may configure a portal for the sale of automobiles, for example, between private parties. In some embodiments, the private parties may be seller system 120 and buyer system 130. Service provider 250 may make prospective seller systems 120 aware of the sales portal via by direct or indirect advertising over network 140, via telephonic, postal, or electronic communication means, or by any suitable means of communication with private parties.

Service provider 250 may receive information about the user or users associated with seller system 120 (i.e. private sellers) via the sales portal and via network 140 (Step 720). The information gathered may include, for example, name, address, social security or other government ID number, credit history, employment information, financial history, information about the item proposed to be sold, and financial service account information. Additionally, the information may include availability for testing of the item, preferred maintenance contractors, a copy of the title to the item, etc. Service provider 250, however, may prompt for more or less information. Service provider 250 may add the sales listing associated with seller system 120 to inventory database 255 (Step 730). Service provider 250 may also create a unique portal page identifying seller system 120, the item that seller system 120 offers for sale, and/or various other information that may be relevant to the sales transaction. The listing within inventory database 255 may be accessible from other portals via network 140, such as a main gateway portal website for service provider 250. Service provider 250 may also transmit information about the sales listing of seller system 120 and/or the listing itself through various means including advertising over network 140, in various media, for example, newspaper classifieds, or via telephonic, postal, or electronic communication means, or by any suitable means of communication.

Service provider 250 may transmit information received about the seller(s) associated with seller system 120 and the item listed for sale by seller system 120 to an entity, such as financial service system 110, for purposes of assessing financing options that may be offered in association with the sale (Step 740).

Service provider 250 may process a risk assessment or other similar creditworthiness analysis of the user or users of seller system 120 using the information received from seller system 120 (Step 750). This assessment may be performed in conjunction with financial service system 110.

Service provider 250 may use the information received from seller system 120, the results of the risk assessment of Step 750, and other predefined criteria to determine whether or not to accept the prospective seller into a seller-based financing program (Step 760). This decision may be made in conjunction with and with input from financial service system 110. In some embodiments, financial service system 110 may provide the financing itself. Service provider 250 may receive notification that financial service system 110 opts not to offer financing for seller system 120 (Step 760; NO), and if so, the seller system 120 may proceed to sell the item on the portal configured by service provider 250 without financing.

Alternatively, service provider 250 may receive notification that financial service system 110 opts to offer financing for seller system 120 (Step 760; YES). Service provider 250 may notify seller system 120 of the acceptance through telephonic, postal, or electronic communication means, or by any suitable means of communication.

Service provider 250 may add information concerning the seller-based financing to the seller system 120 sales listing located within inventory database 255 (Step 770). In some aspects, the information may be a link to a website associated with financial service system 110 stored on memory 112 accessible over network 140. The listing and/or the website associated with financial service system 110 may provide prospective buyers, including buyer system 130, an interface to seek and submit additional information associated with financing the purchase of seller system 120's item.

Service provider 250 may receive information related to creditworthiness from various prospective buyers of the item associated with seller system 120 sales listing located in inventory database 255, including buyer system 130 (Step 780). The information gathered may include, for example, name, address, social security or other government ID number, credit history, employment information, financial history, information about the item proposed to be sold, and financial service account information. Additionally, the information may include availability for testing of the item, preferred maintenance contractors, or other information. Service provider 250, however, may prompt for more or less information.

Figure 8:
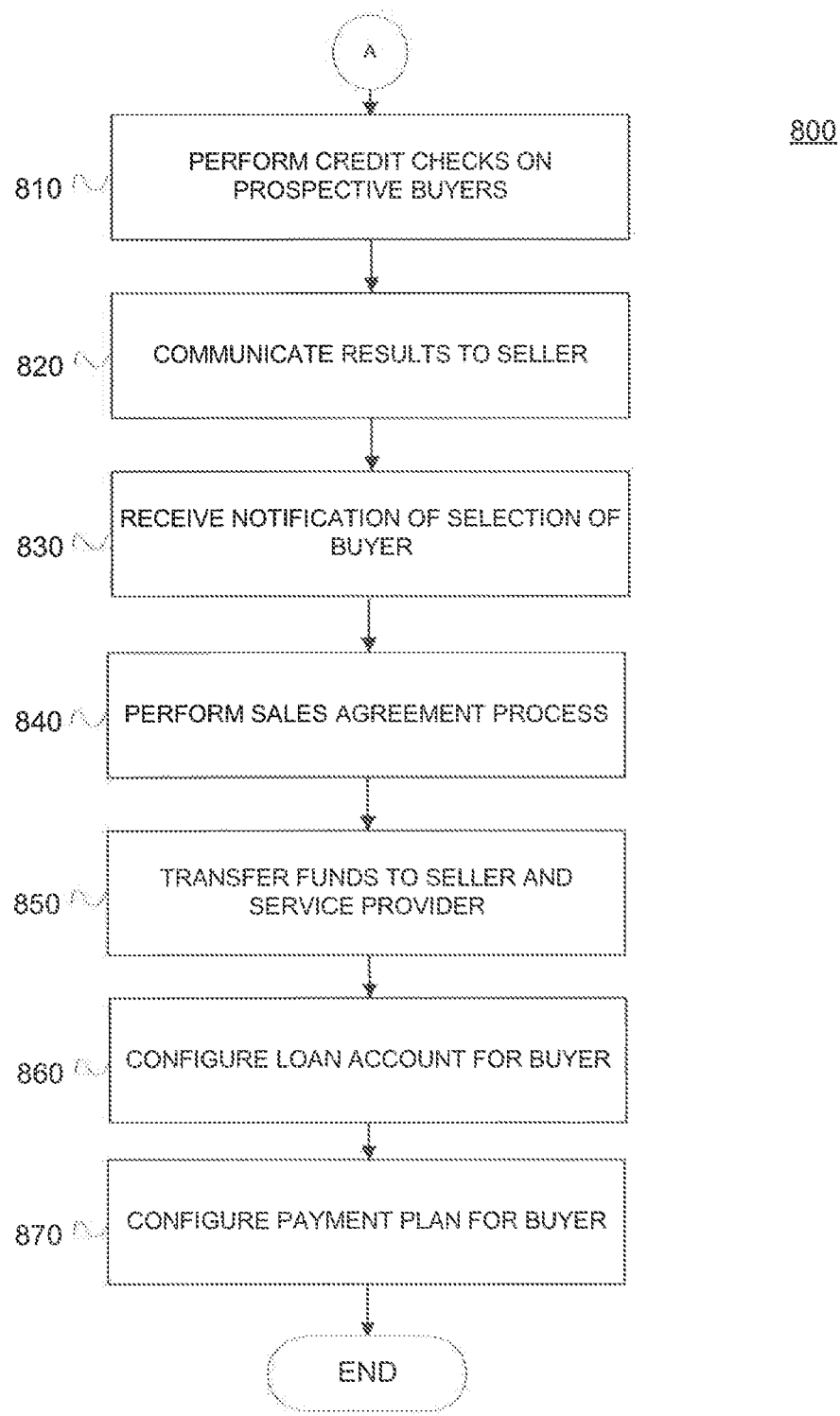
FIG. 8 is a flowchart further describing an exemplary seller-initiated financing process consistent with disclosed embodiments.

FIG. 8 further illustrates the exemplary seller-initiated financing process using an intermediary service provider consistent with disclosed embodiments. This portion of the seller-initiated financing process, described as seller-initiated financing process 800, as well as any or all of the individual steps therein, may be performed by any one or more of financial service system 110, seller system 120, buyer system 130, or service provider 250. For exemplary purposes, FIG. 8 is disclosed as being performed by financial service system 110.

Financial service system 110 may perform or receive information regarding creditworthiness checks on the various prospective buyers, including buyer system 130 (Step 810). Financial service system 110 may perform the creditworthiness checks within its own system, or processor 111 may transmit the information received from prospective buyers to other entities outside of system 100 to perform the creditworthiness checks via network 140.

Financial service system 110 may transmit some or all of the creditworthiness information regarding prospective buyers, including buyer system 130, to seller system 120 (Step 820). Prior to transmitting the information, financial service system 110 may take steps to shield or redact certain portions of the information that may be confidential. Prior to transmitting the information, financial service system 110 may perform various calculations relating to the information gathered in Steps 770 and/or 810. For example, financial service system 110 may offer seller system 120 a portion of the revenue derived from a prospective loan account configured for buyer system 130, and financial service system 110 may offer seller system 120 more or less revenue depending on the identity and creditworthiness of the user of buyer system 130. In other embodiments, financial service system 110 may present data to seller system 120 that reflects the creditworthiness of each buyer, including buyer system 130, and may include the portion of the purchase price of the item that each prospective buyer, including buyer system 130, wishes to finance through seller system 120 and financial service system 110.

Financial service system 110 may receive a notification from seller system 120 of the selection of a preferred buyer (Step 830). For exemplary purposes, this preferred buyer will be buyer system 130. Seller system 120 may select buyer system 130 based on the presentation of information and data in Step 820, and then transmit a notification that it selects buyer system 130. This notification may optionally be also transmitted to buyer system 130.

Financial service system 110 may initiate or perform sales agreement process 500 based on a confirmation of the selection of buyer system 130 (Step 840). Sales agreement process 500 is described above and may be performed substantially as described.

Financial service system 110 may initiate the transfer of funds to seller system 120 and service provider 250 relating to the transaction (Step 850). The funds may be provided via wire transfer, or financial service system 110 may cause the drafting of physical checks and send them to seller system 120 and service provider 250 via postal mail or other communication means. The funds provided to service provider 250 may comprise previously agreed upon flat fees related to the transaction, or may comprise, for example, a percentage of the sales price paid by buyer system 130. The funds provided to seller system 120 may comprise the financed portion of the sales price of the item purchased by buyer system 130. In some embodiments, the funds provided to seller system 120 may comprise the financed portion of the sales price of the item purchased by buyer system 130 less fees charged by financial service system 110. In some embodiments, the funds provided to seller system 120 may comprise the financed portion of the sales price of the item purchased by buyer system 130 plus revenue derived from a loan account configured for buyer system 130 associated with the transaction. In still other embodiments, the funds provided to seller system 120 may comprise the financed portion of the sales price of the item purchased by buyer system 130 plus revenue derived from a loan account configured for buyer system 130 associated with the transaction less fees charged by financial service system 110.

Financial service system 110 may configure a loan account for buyer system 130 (Step 860). Financial service system 110 may also determine or receive information regarding various parameters for the loan account including, for example, amount loaned, interest rate offered, duration of loan, and whether additional collateral other than the item associated with the purchase transaction may be required. It is understood that this list of parameters is not limiting and that any parameters well-known in the art describing and relating to a loan account may be determined by financial service system 110.

Financial service system 110 may also configure a loan payment plan for buyer system 130 (Step 870). Financial service system 110 may determine or receive information regarding various parameters for the loan payment plan including, for example, amount of payment required in each installment, when installment payments will be due, where installment payments are to be sent, etc. It is understood that this list of parameters is not limiting and that any parameters well-known in the art describing and relating to a loan payment plan may be determined by financial service system 110.

Consistent with disclosed embodiments, financial service system 110 or service provider 250 may also utilize information gathered about the buyer, seller, and item to provide additional services to the buyer and seller. Services may comprise activities typically performed by dealers and activities not typically performed during private sales of items. The services may include providing vehicle or item history reports, arranging for appraisal of the item, and running background checks on either the seller or buyer. The services may further include configuring a financial service account that can serve as an escrow account for the transaction. The services may further include arranging and monitoring a meeting place where the buyer and seller can discuss the transaction and test the item.

In some embodiments, the services provided by financial service system 110 or service provider 250 may relate to validating the item. For example, the services may comprise confirming the value of the item, confirming the current and prior ownership of the item, or providing warranty, insurance, and/or service contract documents or logistics. In some embodiments, the services may relate to providing a physical locus for services related to the item. For example, the services may comprise maintaining inventory of items for sale, providing a physical location with consistent operating hours and location for facilitating the sale, providing channels and locations for follow-up communications for all parties involved in the sale, and providing access to a location for warranty and repair services for the item. Additionally, financial service system 110 or service provider 250 may employ outside parties to carry out these activities on their respective behalf.

Other features and functionalities of the described embodiments are possible. For example, the processes of FIGS. 3-8 are not limited to the sequences described above. Variations of these sequences, such as the removal and/or the addition of other process steps may be implemented without departing from the spirit and scope of the disclosed embodiments.

Additionally, the disclosed embodiments may be applied to different types of sales between private parties. Any financial service institution that provides loan accounts to customers may employ systems, methods, and articles of manufacture consistent with certain principles related to the disclosed embodiments. In addition, any buyer or seller of an item in a private transaction may also employ systems, methods, and articles of manufacture consistent with certain disclosed embodiments.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A system for modifying an existing sales website comprising:
    at least one memory device storing instructions; and
    at least one processor configured to execute the instructions to perform operations comprising:
        receiving user information of users of the existing website and a plurality of listings of the existing website, the listings being associated with the users;
        transmitting, to a financial service system, the user information and the listings;
        receiving, from the financial service system, a notification to offer financing to the listings;
        generating a web resource for the existing website, the web resource comprising a web link to financing options by the financial service system, the web link comprising a link to a website associated with the financial service;
        modifying the existing website to include the web resource;
        generating an interface to collect prospective buyer information when the existing website is modified to include the web resource; and
        receiving prospective buyer information via the interface to collect prospective buyer information,
        wherein modifying the existing website comprises modifying the listings to display the web link.

2. The system of claim 1, wherein the web resource further comprises tailored model listings and website templates based on the listings.

3. The system of claim 1, wherein the web resource further comprises at least one of a widget interface or a frame interface for the website.

4. The system of claim 1, wherein the user information comprises name, government identification number, and financial history of users of the website.

5. The system of claim 1, wherein the interface to collect prospective buyer information comprises inputs for name, address, and government identification.

6. The system of claim 1, wherein transmitting the user information comprises redacting confidential portions of the user information.

7. The system of claim 1, wherein the web resource is configured to be displayed on a mobile application running in a mobile device.

8. The system of claim 1, wherein the operations further comprise performing a credit worthiness assessment for the prospective buyer based on the prospective buyer information.

9. The system of claim 1, wherein the operations further comprise:
    receiving, from the financial service system, a notification to not offer financing to any of the listings; and
    modifying the website to reflect unavailability of financing.

10. A computer-implemented method for modifying an existing sales website comprising the following operations performed by at least one processor:
    receiving user information of users of the existing website and a plurality of listings of the existing website, the listings being associated with the users;
    transmitting, to a financial service system, the user information and the listings;
    receiving, from the financial service system, a notification to offer financing to the listings;
    generating a web resource for the existing website, the web resource comprising a web link to financing options by the financial service system, the web link comprising a link to a website associated with the financial service;
    modifying the existing website to include the web resource;
    generating an interface to collect prospective buyer information when the existing website is modified to include the web resource; and
    receiving prospective buyer information via the interface to collect prospective buyer information,
    wherein modifying the existing website comprises modifying the listings to display the web link.

11. The computer-implemented method of claim 10, wherein the web resource further comprises tailored model listings and website templates based on the listings.

12. The computer-implemented method of claim 10, wherein the interface to collect prospective buyer information comprises inputs for name, address, and government identification.

13. The computer-implemented method of claim 10, wherein the web resource is configured to be displayed on a mobile application running in a mobile device.

14. A non-transitory computer-readable medium that stores instructions for modifying an existing sales website that, when executed by at least one processor, cause the at least one processor to:
    receive user information of users of the existing website and a plurality of listings of the website, the listings being associated with the users;
    transmit, to a financial service system, the user information and the listings;
    receive, from the financial service system, a notification to offer financing to the listings;
    generate a web resource for the existing website, the web resource comprising a web link to financing options by the financial service system, the web link comprising a link to a website associated with the financial service;
    modify the website to include the web resource;
    generating an interface to collect prospective buyer information when the existing website is modified to include the web resource; and
    receiving prospective buyer information via the interface to collect prospective buyer information,
    wherein modifying the existing website comprises modifying the listings to display the web link.

15. The system of claim 1, wherein the interface to collect prospective buyer information is customized for the existing website.

16. The system of claim 1, wherein:
    the plurality of listings display a plurality of automobiles; and
    the instructions further comprise providing automobile history reports to the prospective buyer.

17. The system of claim 16, wherein:
    the users comprise private automobile sellers; and
    the instructions further comprise providing a background check of at least one of the private automobile sellers to the prospective buyer.

18. The system of claim 17, wherein the instructions further comprise providing channels for follow-up communications between the private automobile seller and the prospective buyer.

19. The system of claim 16, wherein receiving a plurality of listings of the existing website comprises receiving availability for testing the plurality of automobiles and preferred maintenance contractors the plurality of automobiles.

20. The system of claim 16, wherein the existing website comprises an automobile classified website.

* * * * *

UNITED STATES PATENT AND TRADEMARK OFFICE
CERTIFICATE OF CORRECTION

PATENT NO. : 10,255,633 B2
APPLICATION NO. : 15/901607
DATED : April 9, 2019
INVENTOR(S) : Luke A. Hammock et al.

It is certified that error appears in the above-identified patent and that said Letters Patent is hereby corrected as shown below:

In the Claims

Claim 19, Column 17, Lines 1-2, "preferred maintenance contractors the plurality of automobiles" should read as -- preferred maintenance contractors for the plurality of automobiles --.

Signed and Sealed this
Fifteenth Day of October, 2019

Andrei Iancu
*Director of the United States Patent and Trademark Office*